United States Patent [19] [11] 4,122,928
Smith [45] Oct. 31, 1978

[54] TORQUE CLUTCH COUPLING

[75] Inventor: Theodore M. Smith, 39432 W. Archer Dr., Mt. Clemens, Mich. 48043

[73] Assignee: Theodore M. Smith Trust, Mt. Clemens, Mich.; Lucille G. Smith & Theodore M. Smith, Trustees

[21] Appl. No.: 805,949

[22] Filed: Jun. 13, 1977

[51] Int. Cl.² ............................................. F16D 43/20
[52] U.S. Cl. .............................. 192/56 R; 81/52.4 R
[58] Field of Search .......................... 192/56 R, 150; 81/52.4 R, 52.4 A

[56] References Cited

U.S. PATENT DOCUMENTS

| 1,780,495 | 11/1930 | Meyer | 192/56 R |
| 2,174,342 | 9/1939 | Greulich | 81/52.4 R X |
| 2,259,839 | 10/1941 | Sittert | 192/56 R |
| 3,547,242 | 12/1970 | Braggins | 192/56 R |
| 4,041,729 | 8/1977 | Bilz | 192/56 R X |

Primary Examiner—Allan D. Herrmann
Attorney, Agent, or Firm—Cullen, Sloman, Cantor, Grauer, Scott & Rutherford

[57] ABSTRACT

A torque clutch coupling includes a torque clutch body adapted for support and rotative drive and having an axially disposed drive clutch thereon. A casing is mounted on and encloses said clutch. An adapter for a driven member is nested within said case and is spaced from the drive clutch. A driven torque clutch is loosely mounted over said adapter within said case and is normally biased for engagement with said drive clutch. An adjustable rotative drive mechanism is interposed between said driven clutch and adapter, and includes multiple interconnected projections, at least one of said projections lying in an inclined plane and at an angle to the case axis, whereby upon the adapter encountering a torque in excess of a predetermined torque, there will be a relative movement between the projections, such that the driven clutch is cammed into longitudinal movement within the case completely disengaging from the drive clutch.

17 Claims, 7 Drawing Figures

TORQUE CLUTCH COUPLING

BACKGROUND OF THE INVENTION

Heretofore in the use of torque clutch couplings employed for transmitting the rotative drive to an adapter or driven member which may include a tool such as a tap, a reamer or other tool, or which could be any driven member adapted to do work such as operating a conveyor or other mechanism, when the driven member encounters a torque or resistance in excess of a predetermined torque damage or destruction or excessive wear of the coupling may result.

Heretofore in some devices of this type wherein there has been such excess torque, there has been a partial disengagement automatically between the drive clutch and the driven clutch but wherein, there is nevertheless some engagement remaining between the two clutch members such as will create noise and chatter and eventually wear out the coupling.

Examples of some efforts to overcome this problem are found in U.S. Pat. Nos. 3,521,314 and 3,787,136.

SUMMARY OF THE INVENTION

It is an object of the present invention to provide an improved torque clutch coupling for use in transmitting a rotative drive to a driven member or an adapter and wherein, should there arise in the driven member a torque in excess of a predetermined torque, there will be a complete automatic disengagement of the driven torque clutch with respect to the drive clutch such that the drive clutch will continue to rotate freely of and independent of the driven clutch, thus preventing damage to the clutch coupling.

It is a further object to provide an improved torque clutch coupling wherein, within the casing housing for the drive clutch and the driven clutch, there is disposed an adapter within the driven clutch together with an adjustable drive mechanism between said driven clutch and adapter such that upon receipt of an excessive torque to said adapter beyond a predetermined torque, the driven clutch will be cammed longitudinally completely out of engagement with the driven clutch.

In accordance with the present invention, there is provided a torque clutch coupling comprising an elongated torque clutch body adapted for support and rotative drive at one end upon a longitudinal axis; an axial torque drive clutch at its other end; a torque case mounted on and enclosing said drive clutch; an adapter nested within said case coaxial of and spaced from said drive clutch; said adapter adapted to axially mount a driven member for rotative drive thereof; a driven torque clutch axially nested and journalled within said case, loosely receiving said adapter and normally connected to said drive clutch; yieldable means in said case bearing against said driven clutch normally maintaining the driven clutch in operative registry with said drive clutch; said driven clutch adapted for longitudinal movement within said case; and an adjustable rotative drive means between and interconnecting said driven clutch and adapter, and including multiple interconnected projections, at least one of said projections lying in an inclined plane at an angle to said axis, whereby a torque encountered by said adapter and driven member in excess of a predetermined torque, will effect an automatic longitudinal movement of said driven clutch relative to the drive clutch, completing disengaging said driven clutch therefrom, said drive clutch adapted for free rotation with respect to said adapter and driven member.

These and other objects will be seen from the following specification and claims in conjunction with the appended drawings.

THE DRAWINGS

It will be understood that the above drawings illustrate merely a preferred embodiment of the invention, and that other embodiments are contemplated within the scope of the claims hereafter set forth.

DETAILED DESCRIPTION OF THE INVENTION

Figure 1:
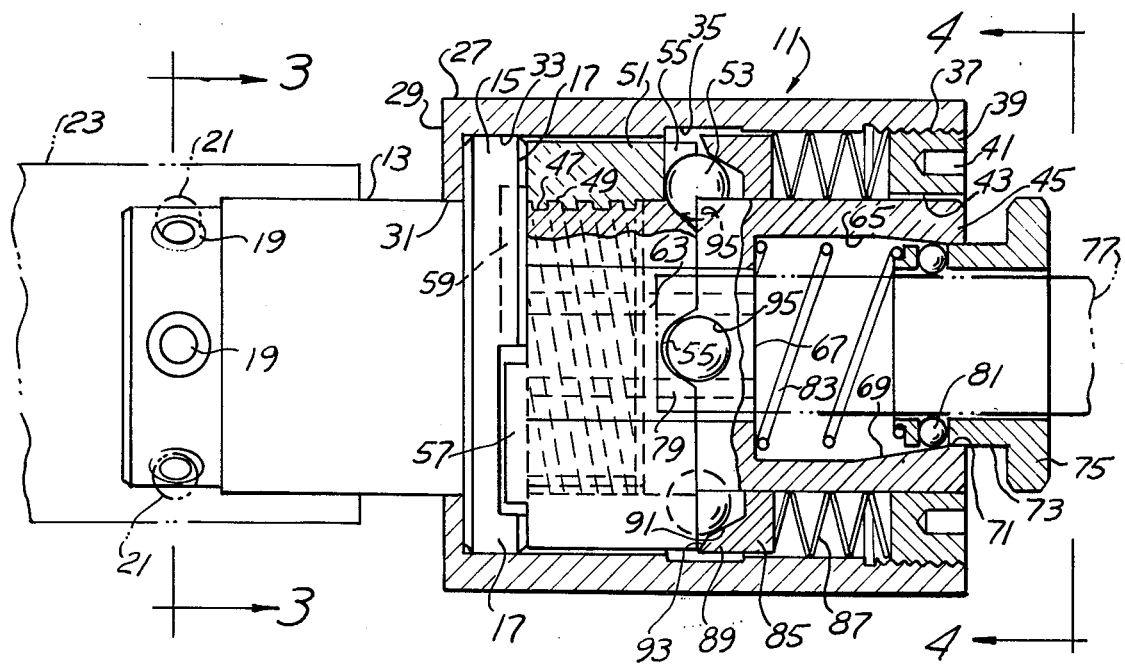
FIG. 1 is a fragmentary longitudinal section of the present torque clutch coupling in driven relation with a portion of the driven member shown in phantom lines.

The present torque clutch coupling is generally indicated at 11 in FIG. 1 and includes an elongated torque body 13 with annular flange 15 at one end terminating in a torque drive clutch 17. In the illustrative embodiment of the invention, said torque drive clutch includes a series of spaced radially extending ribs.

The torque clutch body 13 is adapted for rotative drive and longitudinal feed in a conventional manner. One form of rotative drive includes within one end of the torque body a series of spaced radial ball sockets 19 receiving balls 21 mounted within corresponding sockets of a standard ball drive spindle such as shown at 23, FIG. 1.

It is contemplated that any other form of mounting for the torque body could be utilized as, for example, projection into a power-rotated spindle with a locking device interposed such as a spline or a key. It is considered furthermore that rotative drive of the torque body could be manually.

Cylindrical torque case 27 has a radial flange 29 at one end and is apertured at 31 to receive body 13 and for retainingly enclosing flange 15 and the axially disposed torque drive clutch 17 within its bore 33. Said case has a counterbore 35 and is threaded at 37 at its open end to receive the torque adjusting nut 39 having spanner apertures 41.

Elongated cylindrical adapter 45 is loosely disposed through the bore 43 of said nut and is projected into the case 27 with its inner end spaced from drive clutch 17. The opposite end of said adapter is adapted to supportably drive the axially disposed driven member 77 hereafter described in detail.

The centrally apertured driven torque clutch 51 is positioned loosely over and around said adapter and one end face thereof includes the axial driven clutch member 57. Said driven clutch member consists of a series of opposed slotted portions which are normally cooperatively interlocked with the drive clutch 17.

An adjustable feed mechanism is interposed between the driven clutch and adapter 45 whereby relative rotative motion between the driven clutch and adapter will effect longitudinal movement of the driven clutch.

The adjustable feed mechanism between said driven clutch and adapter is in the nature of multiple interlocking projections, or a projection and groove and wherein, at least one of said projections lies in an inclined plane with respect to the longitudinal axis of the body and case. Thus, upon the encountering by said adapter of a torque in excess of a predetermined torque, and due to the rotative drive of the torque body 13, there will be achieved a relative angular movement between said projections such as will effect a longitudinal movement of the driven clutch member 57 a sufficient distance as to move completely out of engagement with drive clutch 17.

In the illustrative embodiment of the present invention, the corresponding interlocking projections referred to for achieving this longitudinal disengaging movement of the driven clutch includes internal Acme helical threads 47 on clutch 51 in mesh with corresponding external Acme helical threads 49 on adapter 45, FIG. 1.

In the illustrative embodiment, the angular threads 47,49 extend at an angle of 10° approximately with respect to the longitudinal axis of the torque body. This angle could vary between 1° and 89°, for example, or more practically, between 5° and 85°.

Figure 2:
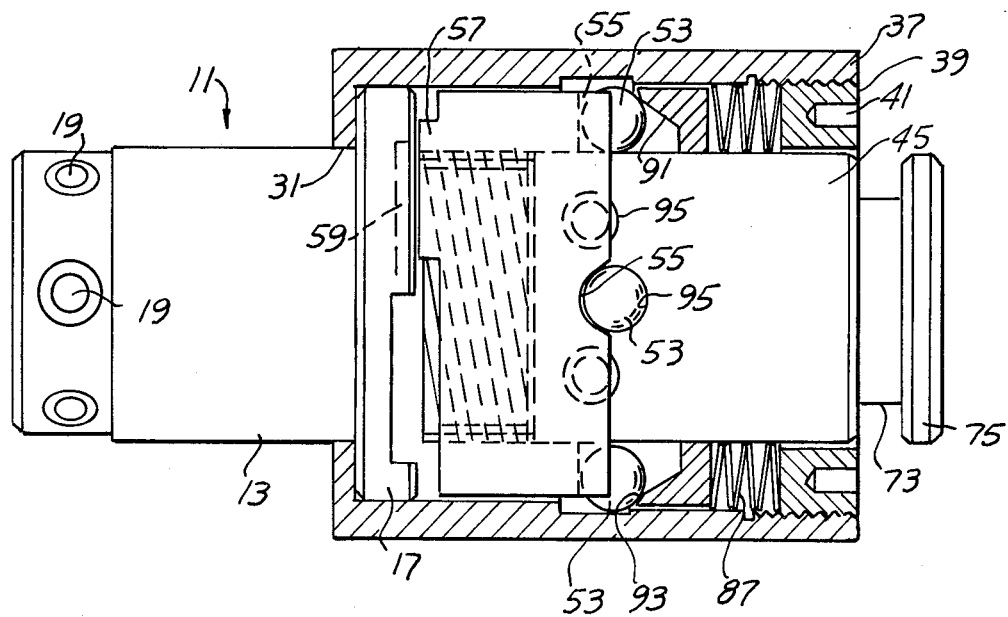
FIG. 2 is a similar view with the clutch disengaged.
Figure 3:
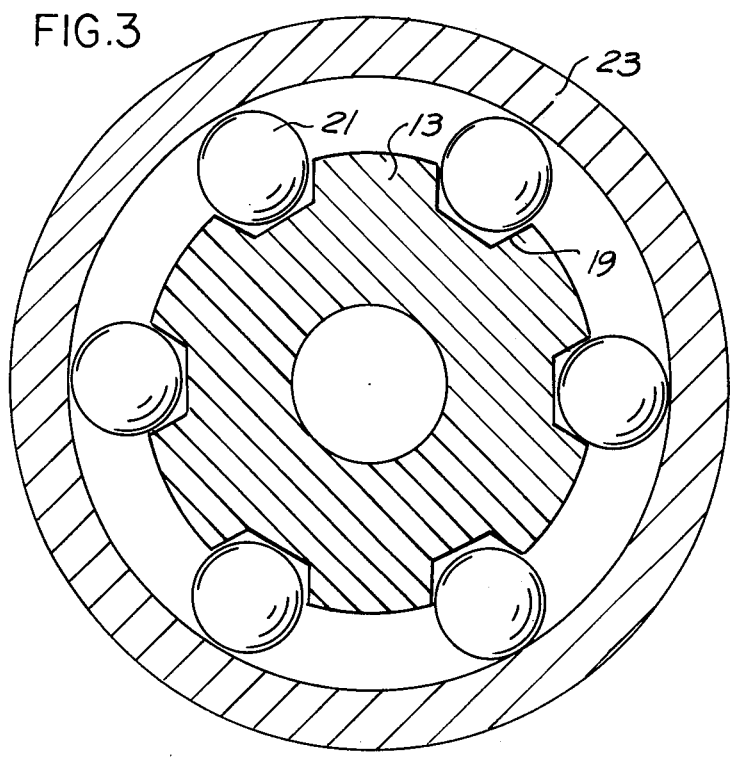
FIG. 3 is a section taken in the direction of arrows 3—3 of FIG. 1 showing one illustrative form of rotative drive.
Figure 4:
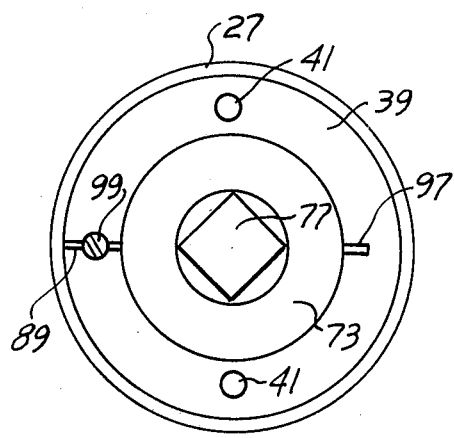
FIG. 4 is an end view of the coupling taken in the direction of arrows 4—4 of FIG. 1.
Figure 5:
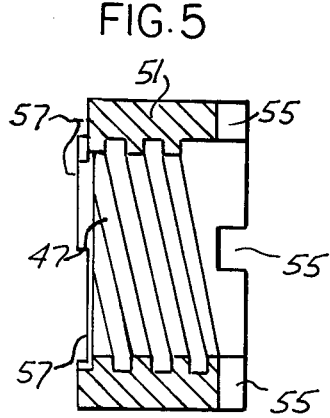
FIG. 5 is a vertical section of one form of the present driven torque clutch.
Figure 6:
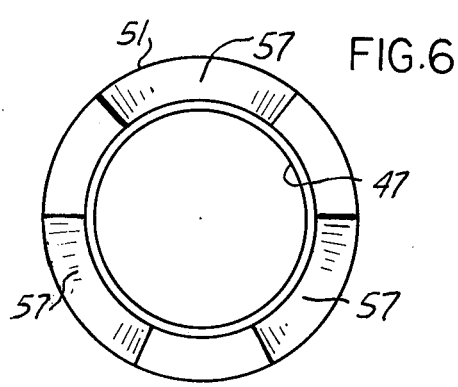
FIG. 6 is an end view thereof.

In FIG. 2, a bearing means; namely, a series of radially movable balls 53 are nested within radial end slots 55 of clutch 51 and are interposed between the clutch and with the case bore 35, when said clutch is disengaged.

This provides a means of journalling the driven clutch within the case 27 and for reducing friction therebetween.

As shown in FIG. 1, there are interposed between the end face of the torque body 13 and adapter 45 a series of radially extending end thrust rollers 59.

Adapter 45 at its inner end has a fluted bore 63 or a series of angularly related flat surfaces which terminate at one end in the enlarged counterbore 65 defining shoulder 67 and the outer inwardly tapered bore 69 terminating in the annular open end 71.

A conventional adjustable bushing 73 of cylindrical form and having an annular outer flange 75 thereon projects through the open end 71 of said adapter and extends into and within the tapered bore 69. The bushing mounts a series of spaced balls 81 which are normally nested within the bushing and outwardly thereof are adapted to engage the tapered bore 69 and at their inner sides are adapted to frictionally and retainingly engage a driven member 77. Said driven member may be a machine tool such as a drill, a reamer or a boring tool which projects through the bore of the bushing and whose inner end is similarly fluted at 79 or otherwise has corresponding irregular surfaces for interlock with the corresponding fluted portions 63 of the adapter for a rotative drive therebetween.

The bushing 75 functions in a conventional manner and is normally biased outwardly to the position shown for gripping the driven member 77 by a coil spring 83 which rests against the seat 67.

It is contemplated as part of the present invention and utilizing the present torque clutch coupling that the driven member 77 may be any rotatable member which will be subjected to a torque for driving something such as pinion or gear with respect to conveyor or any other mechanism utilizing a rotative drive.

The assembly of the driven clutch member 57 into normal interengagement with the drive clutch 17 includes the apertured spring seat washer 85 which surrounds the adapter and bears against the driven clutch with balls 53 interposed. A suitable spring means is interposed in compression between said washer and the torque adjustment nut 39 so as to adjustably bias the driven clutch into cooperative engagement with the drive clutch 17. In the illustrative embodiment, the spring means includes a series of stacked Belleville springs 87 which are nested within the case 27 and interposed in compression between said nut and washer 85.

Accordingly, the driven clutch 51 is adapted for longitudinal adjustment within the case against the action of the springs 87 under certain conditions of excessive torque but due to the springs is in a normal innerconnected driven relation with respect to drive clutch 17, FIG. 1.

Figure 7:
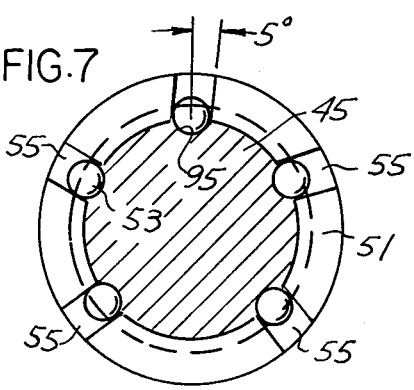
FIG. 7 is an end view of the driven clutch showing its angular ball slots.

Said washer has an annular flange 89 defined by outwardly tapered cam surfaces 91 and 93. In normal drive rotation, balls 53 are at the inner ends of angular slots 55, bear against cam surface 91, and register with drive openings 95 within adapter 45, FIGS. 1, 2 and 7. The angular slots provide an increase in torque on reverse rotation. This assures return movement of clutch 51 for positive drive connection with clutch 17.

When clutch 51 is disengaged from drive clutch 17, FIG. 2, and advanced away from clutch 17, balls 53 move radially outward to nest within the case internal groove 35. Here the balls bear against cam surface 93.

In the illustrative embodiment, the compression of springs 87 is adjustable by rotative adjustment of the torque adjustment nut 39 using a suitable spanner wrench.

This, therefore, regulates the amount of tension or bias of the driven clutch 51 with respect to drive clutch 17. Nut 39 has a transverse slot 97 extending partly through the nut and adjacent the open end thereof includes a transverse bore adapted to receive the lock screw 99 for frictionally locking the torque adjustment nut in any desired position of adjustment relative to the case 27.

OPERATION

In operation, should the adapter 45 and the driven member 77 projecting therefrom be subjected to a torque or torque load in excess of a predetermined torque, such as would tend to slow down or stop the rotation of the adapter and driven member, there will be an automatic movement of the clutch internal helical threads 47 within and with respect to the external adapter helical threads 49.

This will cause a camming action with respect to the driven clutch and, accordingly, advance the driven clutch longitudinally against the action of the springs 87 a distance sufficient to completely disengage the driven clutch 57 from the drive clutch 17, FIG. 2.

This movement of clutch 51 displaces drive balls 53 from the adapter ball sockets 95. The balls 53 are moved radially outward by the wall of the adapter 45 and cam surface 93 to the idle position in FIG. 2.

This would result in the continued free rotation of the torque body 13, the case 27 and the drive clutch 17 with respect to the stationary driven clutch 51.

At reversal of the drive, the action of the springs 87 is effective to return the driven clutch 51 into cooperative engagement with drive clutch 17, and the drive balls 53 return to the adapter ball sockets 95 resetting the pre-set torque for the next rotative drive.

In the illustrative embodiment, the aforesaid longitudinal disengaging movement of the driven clutch is achieved with the Acme helical threads moving in the respective angular slots defined by the corresponding intermeshing helical threads 49 in the adapter, such that there will be a longitudinal camming action of the driven clutch within said case and relative to the drive clutch sufficient to disengage completely the driven clutch from said drive clutch so that the drive clutch is, in effect, free wheeling during such period of excessive torque. The driven clutch is prevented from moving back into engagement with the drive clutch as long as rotation of spindle and drive clutch continues and is not reversed. This is due to the continuing cam action between threads 47 and 49 which cause longitudinal movement of the driven clutch relative to the adapter 45.

More broadly stated, there is provided multiple cooperating projections between the driven clutch and the adapter such that upon such excessive torque, there will be a camming action of one of the projections with respect to the other to effect such longitudinal movement. Such camming action could be accomplished by the use of drive balls movable within angular slots in the clutch and nested in sockets in the adapter, or corresponding projections with the gear teeth inclined on an angle within the range above described. The ball and angular groove is merely an illustrative form for accomplishing the clutch separation herein.

In the operation of the present device, rotative drive and longitudinal feed is achieved in a conventional manner through any form of spindle or holder of the replaceable adapter-type or other make for rotating clutch body 13 and clutch 17. The driven clutch 57 is kept in contact with the driving clutch 17 by the springs 87 adjusted by the nut 39 to the desired and selected torque setting.

As the selected torque setting is reached or exceeded, the clutch helical threads 47 in mesh with helical threads 49 within the adapter are movable within threads 49 such as to cam the clutch longitudinally forward completely disengaging from drive clutch 17 when the threads 47 reach the limit of the spiral slots or inclined threads 49. Accordingly, the adapter 45 and the driven clutch cease rotation in relation to drive clutch 17, case 27 and the clutch body 13.

Upon a reverse rotation of the clutch body 13, the torque clutch drive balls 53 move to their original location, FIG. 1, within the adapter sockets 95 since the springs 87 are effective to move the driven clutch longitudinally rearward so as to re-engage with the drive clutch 17. This reengagement is accomplished since the reversed rotation of member 13 acts on case 27. Springs 87 act upon cone ring 85 applying inward axial pressure on balls 53. These in turn apply a backward force on the slotted portion 55 moving driven clutch 51 on the helical threads 49 on adapter 45. It is contemplated that the thread angle of 10° can be varied as desired up to approximately 85°. As the 10° angle is increased, there will be a corresponding increase in the excess torque required to effect the aforedescribed clutch automatic disengaging action.

Having described my invention, reference should now be had to the following claims:

I claim:

1. A torque clutch coupling comprising an elongated torque clutch body adapted for support and rotative drive at one end upon a longitudinal axis;
   an axial torque drive clutch at its other end;
   a torque case mounted on and enclosing said drive clutch;
   an adapter nested within said case coaxial of and spaced from said drive clutch;
   said adapter adapted to axially mount a driven member for rotative drive thereof;
   a driven torque clutch axially nested and journalled within said case, loosely receiving said adapter and normally connected to said drive clutch;
   yieldable means in said case bearing against said driven clutch normally maintaining the driven clutch in operative registry with said drive clutch;
   movable drive means on said driven clutch interconnecting said driven clutch and adapter;
   said driven clutch adapted for longitudinal movement within said case;
   and an adjustable rotative means between and interconnecting said driven clutch and adapter, and including multiple interconnected projections, at least one of said projections lying in an inclined plane at an acute angle to said axis, whereby a torque encountered by said adapter and driven member in excess of a predetermined torque, will effect an automatic longitudinal camming movement of said driven clutch relative to the drive clutch, completely disengaging said driven clutch therefrom, said drive clutch adapted for free rotation with respect to said adapter and driven member.

2. In the torque clutch coupling of claim 1, end thrust bearings interposed between said torque clutch body and adapter.

3. In the torque clutch coupling of claim 1, bushing means adjustably nested within said adapter for receiving and securing said driven member.

4. In the torque clutch coupling of claim 1, said movable drive means including bearing means interposed between said case and driven torque clutch.

5. In the torque clutch coupling of claim 1, said angle being ten degrees approximately.

6. In the torque clutch coupling of claim 1, said angle being in the range of 5° to 85°.

7. In the torque clutch coupling of claim 1, said torque clutch body having an annular flange at one end within and retainingly engaging said case; said flange terminating in said drive clutch.

8. In the torque clutch coupling of claim 1, said yieldable means including spring means bearing against one end of said driven clutch; and a torque adjustment nut threaded into said case engaging said spring means.

9. In the torque clutch coupling of claim 8, said spring means including a series of Belleville springs.

10. In the torque clutch coupling of claim 1, said adjustable rotative means including an internal helical thread on said driven clutch in mesh with and movably nested within a corresponding helical thread on said adapter, whereby upon the encountering of said excessive torque by said adapter, the clutch helical threads move in said adapter threads camming said driven clutch for longitudinal movement out of engagement with said drive clutch, completely separating said clutches.

11. In the torque clutch coupling of claim 10, and said movable drive means including drive balls on said driven clutch nested within corresponding sockets in said adapter; said disengaging movement of said driven clutch camming said drive balls radially outward separating them from the adapter sockets.

12. In the torque clutch coupling of claim 10, said helical threads being at an angle of ten degrees approximately.

13. In the torque clutch coupling of claim 10, said helical threads being at an angle in the range of 5° to 85°.

14. In the torque clutch coupling of claim 10, said movable drive means including drive balls on said driven clutch nested within corresponding sockets in said adapter; said disengaging movement of said driven clutch camming said drive balls radially outward separating them from the adapter sockets; there being a series of radial slots in said driven clutch at one end thereof, said drive balls being movably nested in said radial slots.

15. In the torque clutch coupling of claim 14, said clutch ball slots being angular.

16. In the torque clutch coupling of claim 1, said yieldable means including spring means bearing against one end of said driven clutch; and a torque adjustment nut threaded into said case engaging said spring means; (there being) said movable drive means including a plurality of radial slots at one end of the driven clutch; corresponding drive balls movably nested in said slots, and within corresponding sockets in said adapter for rotating said adapter; said spring means including a longitudinally adjustable cup washer axially nested within said case and loosely surrounding said adapter, and bearing against said drive balls.

17. In the torque clutch coupling of claim 16, an annular tapered cam surface on said cup washer bearing against said balls, whereby on longitudinal disengaging movement of said driven clutch, said drive balls are cammed to move radially outward in their slots disengaging from said adapter.

* * * * *